(12) United States Patent
Kareff et al.

(10) Patent No.: US 10,584,597 B2
(45) Date of Patent: Mar. 10, 2020

(54) VARIABLE CROSS-SECTION DAMPER PIN FOR A TURBINE BLADE

(71) Applicant: General Electric Company, Schenectady, NY (US)

(72) Inventors: Spencer A. Kareff, Simpsonville, SC (US); Sheo Narain Giri, Bangalore (IN)

(73) Assignee: General Electric Company, Schenectady, NY (US)

( * ) Notice: Subject to any disclaimer, the term of this patent is extended or adjusted under 35 U.S.C. 154(b) by 1071 days.

(21) Appl. No.: 14/844,306

(22) Filed: Sep. 3, 2015

(65) Prior Publication Data
US 2017/0067351 A1 Mar. 9, 2017

(51) Int. Cl.
*F01D 5/26* (2006.01)
*F01D 5/22* (2006.01)

(52) U.S. Cl.
CPC .............. *F01D 5/26* (2013.01); *F01D 5/22* (2013.01); *F05D 2220/30* (2013.01);
(Continued)

(58) Field of Classification Search
CPC ..... F01D 5/22; F01D 5/26; F01D 5/24; F01D 5/10; F01D 5/16; F01D 25/04; F01D 25/06; F01D 5/00; F01D 5/225; F01D 11/005; F01D 11/006; F05D 2220/30; F05D 2240/30; F05D 2260/96; F05D 2220/32; F05D 2250/182; F05D 2250/294; F05D 2250/141; Y02T 50/671
(Continued)

(56) References Cited

U.S. PATENT DOCUMENTS 3,266,770 A   8/1966   Harlow
3,881,844 A   5/1975   Hennessey et al.
(Continued)

FOREIGN PATENT DOCUMENTS

EP   2 472 065 A1   7/2012
EP   2 738 353 A2   6/2014
(Continued)

OTHER PUBLICATIONS

Kareff, et al., filed Sep. 3, 2015, U.S. Appl. No. 14/844,280.
(Continued)

*Primary Examiner* — Patrick Hamo
*Assistant Examiner* — Paul W Thiede
(74) *Attorney, Agent, or Firm* — Dority & Manning, P.A.

(57) ABSTRACT

A damper pin for damping adjacent turbine blades coupled to a rotor shaft includes an elongated body having a center portion that is disposed between a first end portion and a second end portion. The first end portion, center portion and second end portion at least partially define a generally arcuate top portion of the elongated body. At least a portion of the top portion may be configured to contact with a groove that is defined between the adjacent turbine blades. The first end portion and the second end portion have substantially semi-cylindrical cross sectional shapes and the center portion has a cylindrical cross sectional shape. A bottom portion of the elongated body diverges radially outwardly from the first end portion to the center portion and from the second end portion to the center portion.

17 Claims, 3 Drawing Sheets

(52) U.S. Cl.
CPC ...... *F05D 2240/30* (2013.01); *F05D 2260/96* (2013.01); *Y02T 50/671* (2013.01)

(58) Field of Classification Search
USPC ...................................... 416/145, 190, 196 R
See application file for complete search history.

(56) References Cited

U.S. PATENT DOCUMENTS

| | | | |
|---|---|---|---|
| 4,088,421 A * | 5/1978 | Hoeft | F01D 5/22 416/145 |
| 4,872,812 A | 10/1989 | Hendley et al. | |
| 4,936,749 A | 6/1990 | Arrao et al. | |
| 5,226,784 A | 7/1993 | Mueller et al. | |
| 5,478,207 A | 12/1995 | Stec | |
| 5,827,047 A | 10/1998 | Gonsor et al. | |
| 6,171,058 B1 | 1/2001 | Stec | |
| 6,354,803 B1 | 3/2002 | Grover et al. | |
| 6,450,769 B2 | 9/2002 | Szwedowicz | |
| 6,478,544 B2 | 11/2002 | Brandl et al. | |
| 6,659,725 B2 | 12/2003 | Yeo et al. | |
| 6,776,583 B1 | 8/2004 | Wang et al. | |
| 6,851,932 B2 | 2/2005 | Lagrange et al. | |
| 7,163,376 B2 | 1/2007 | Itzel et al. | |
| 7,534,090 B2 | 5/2009 | Good et al. | |
| 7,731,482 B2 | 6/2010 | Lagrange et al. | |
| 2006/0177312 A1 | 8/2006 | Tomita et al. | |
| 2006/0257262 A1 | 11/2006 | Itzel et al. | |
| 2012/0121424 A1 * | 5/2012 | Wassynger | F01D 5/24 416/190 |
| 2012/0237348 A1 * | 9/2012 | Thomen | F01D 5/22 416/196 R |
| 2013/0276456 A1 | 10/2013 | Propheter-Hinckley et al. | |
| 2014/0079529 A1 | 3/2014 | Kareff et al. | |
| 2014/0112792 A1 | 4/2014 | Thomen et al. | |
| 2014/0147276 A1 | 5/2014 | Robert, III et al. | |

FOREIGN PATENT DOCUMENTS

| | | |
|---|---|---|
| EP | 3 043 085 A1 | 7/2016 |
| EP | 3 070 274 A1 | 9/2016 |
| EP | 3 078 808 A1 | 10/2016 |
| EP | 3 093 439 A1 | 11/2016 |

OTHER PUBLICATIONS

Kareff, et al., filed Sep. 3, 2015, U.S. Appl. No. 14/844,294.
Kareff, et al., filed Sep. 3, 2015, U.S. Appl. No. 14/844,317.
Kareff, et al., filed Sep. 3, 2015, U.S. Appl. No. 14/844,392.
Kareff, et al., filed Jan. 5, 2016, U.S. Appl. No. 14/988,070.
Kareff, et al., filed Sep. 3, 2015, U.S. Appl. No. 14/844,545.
Extended European Search Report and Opinion issued in connection with related EP Application No. 16185251.2 dated Jan. 31, 2017.
Extended European Search Report and Opinion issued in connection with related EP Application No. 16183857.8 dated Feb. 3, 2017.
Extended European Search Report and Opinion issued in connection with related EP Application No. 16186535.7 dated Feb. 3, 2017.
Extended European Search Report and Opinion issued in connection with corresponding EP Application No. 16183856.0 dated Feb. 3, 2017.
Extended European Search Report and Opinion issued in connection with related EP Application No. 16184881.7 dated Feb. 3, 2017.
Extended European Search Report and Opinion issued in connection with related EP Application No. 16185255.3 dated Feb. 3, 2017.
Non-Final Rejection towards related U.S. Appl. No. 14/844,294 dated Mar. 23, 2017.
Final Rejection towards related U.S. Appl. No. 14/844,294 dated Jul. 24, 2017.
Co-Pending U.S. Appl. No. 14/844,280, filed Sep. 3, 2015.
Co-Pending U.S. Appl. No. 14/844,294, filed Sep. 3, 2015.
Co-Pending U.S. Appl. No. 14/844,317, filed Sep. 3, 2015.
Co-Pending U.S. Appl. No. 14/844,392, filed Sep. 3, 2015.
Co-Pending U.S. Appl. No. 14/988,070, filed Jan. 5, 2016.
Co-Pending U.S. Appl. No. 14/844,545, filed Sep. 3, 2015.

* cited by examiner

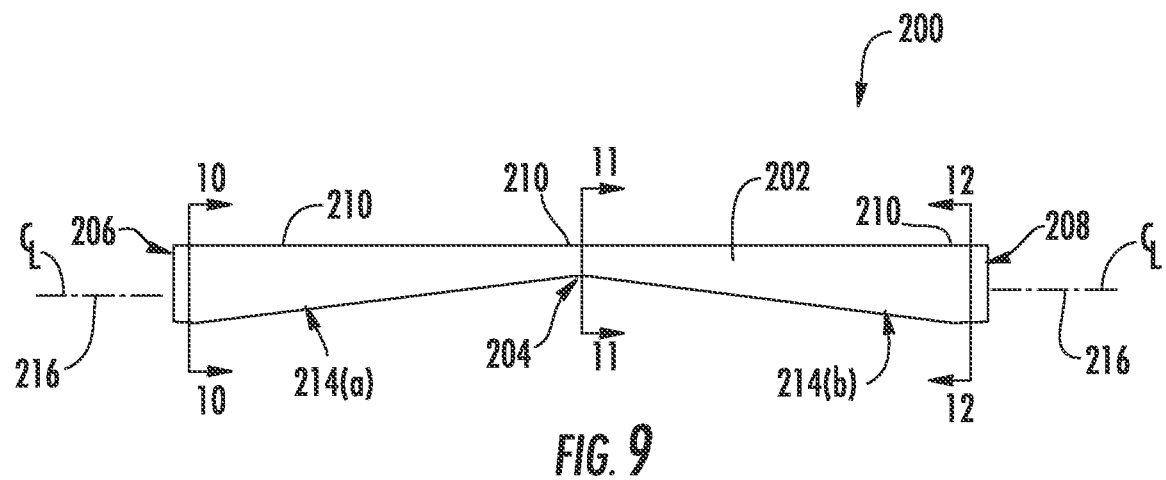
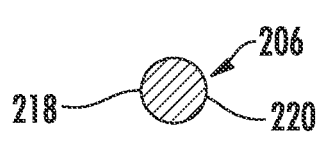 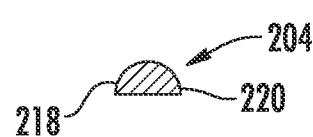 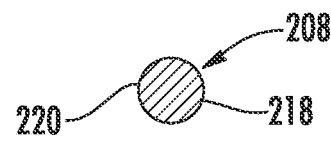
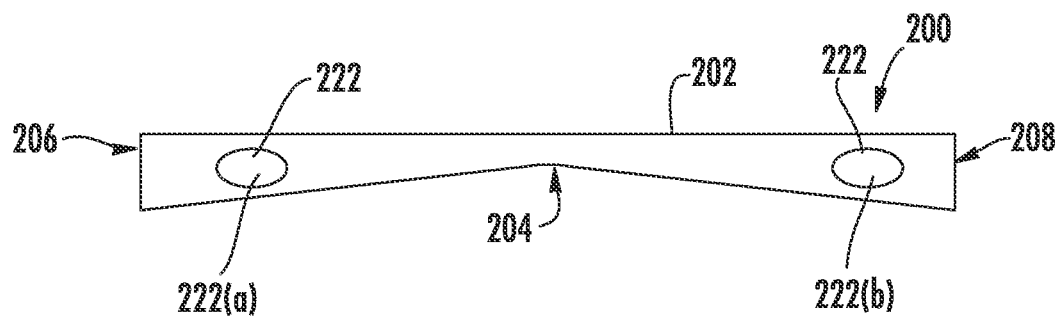

VARIABLE CROSS-SECTION DAMPER PIN FOR A TURBINE BLADE

FIELD OF THE INVENTION

The present invention generally relates to a turbomachine having multiple circumferentially aligned turbine blades. More particularly, this invention involves a damper pin having a cross sectional shape that is discontinuous for providing vibration damping between adjacent turbine blades.

BACKGROUND OF THE INVENTION

A turbine blade, also known as a turbine bucket or turbine rotor blade, converts energy from a flowing fluid such as hot combustion gas or steam into mechanical energy by causing a rotor shaft of a turbomachine to rotate. As the turbomachine transitions through various operating modes, the turbine blades are subjected to both mechanical and thermal stresses.

A turbine blade generally includes an airfoil that extends radially outwardly from a platform, a shank that extends radially inwardly from the platform and a dovetail or mounting portion that extends radially inwardly from the shank. The dovetail of each turbine blade is secured within a complementary slot defined in a rotor wheel or disk. The rotor wheel is coupled to the rotor shaft.

During engine operation, vibrations may be introduced into the turbine blades. For example, fluctuations in flow of the hot combustion gases or steam may cause them to vibrate. One basic design consideration for turbomachine designers is to avoid or to minimize resonance with natural frequencies of the turbine blades and the dynamic stresses produced by forced response and/or aero-elastic instabilities, thus controlling high cycle fatigue of the turbine blades. In order to improve the high cycle fatigue life of a turbine blade, vibration dampers are typically provided below and/or between the platforms to frictionally dissipate vibratory energy and reduce the corresponding amplitude of vibration during operation. The amount of vibrational energy that is removed by the vibration damper is a function of the dynamic weight of the vibration damper and the reaction loads.

Although known dampers may be largely adequate during typical operations, there is a desire to improve overall damper effectiveness. Prior attempts to accomplish damping of vibrations have included round damper pins, sheet metal flat dampers, or complex wedge shaped dampers. Often true damper performance of these types of dampers is not known until the first engine test. However, at that time, the damper pocket geometry in the turbine blades is locked in by hard tooling. Thus, if the damper does not perform as expected, then a potentially expensive tooling rework may be required. Accordingly, there is desire for a damping pin that provides a natural frequency tuning tool for resonant mode excitation avoidance and that enables independent mode tuning options without necessitating changes to the design of an existing turbine blade.

BRIEF DESCRIPTION OF THE INVENTION

Aspects and advantages of the invention are set forth below in the following description, or may be obvious from the description, or may be learned through practice of the invention.

One embodiment of the present invention is a damper pin for damping adjacent turbine blades coupled to a rotor shaft. The damper pin includes an elongated body having a center portion that is disposed between a first end portion and a second end portion. The first end portion, center portion and second end portion at least partially define a generally arcuate top portion of the elongated body. At least a portion of the top portion may be configured to contact with a groove that is defined between the adjacent turbine blades. The first end portion and the second end portion have substantially semi-cylindrical cross sectional shapes and the center portion has a cylindrical cross sectional shape. A bottom portion of the elongated body diverges radially outwardly from the first end portion to the center portion and from the second end portion to the center portion.

Another embodiment includes a damper pin for damping adjacent turbine blades coupled to a rotor shaft. The damper pin includes an elongated body having a center portion that is disposed between a first end portion and a second end portion. The first end portion, center portion and second end portion at least partially define a generally arcuate top portion of the elongated body. At least a portion of the top portion is configured to contact with a groove defined between the adjacent turbine blades. The first end portion and the second end portion have cylindrical cross sectional shapes and the center portion has a substantially semi-cylindrical cross sectional shape. A bottom portion of the elongated body converges radially inwardly from the first end portion and the second end portion to the center portion.

Another embodiment of the present invention is a turbine engine. The turbine engine includes a rotor shaft that extends axially within the turbine engine and an adjacent pair of turbine blades that are coupled to the rotor shaft. Each turbine blade at least partially defines a groove that extends along a slash face of the corresponding turbine blade. The turbine engine further includes a damper pin that is disposed within the groove between the adjacent turbine blades. The damper pin includes an elongated body having a center portion that is disposed between a first end portion and a second end portion. The first end portion, center portion and second end portion at least partially define a generally arcuate top portion of the elongated body. At least a portion of the top portion may be configured to contact with a groove that is defined between the adjacent turbine blades. The first end portion and the second end portion have substantially semi-cylindrical cross sectional shapes and the center portion has a cylindrical cross sectional shape. A bottom portion of the elongated body diverges radially outwardly from the first end portion to the center portion and from the second end portion to the center portion.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 9 is a side view of an exemplary damper pin according to one embodiment of the present invention;

FIG. 10 is a cross sectioned end view of the damper pin as shown in FIG. 9 taken along section line 10-10;

FIG. 11 is a cross sectioned end view of the damper pin as shown in FIG. 9 taken along section line 11-11;

FIG. 12 is a cross sectioned end view of the damper pin as shown in FIG. 9 taken along section line 12-12;

FIG. 13 is a side view of the exemplary damper pin as shown in FIG. 9, according to one embodiment of the present invention.

DETAILED DESCRIPTION OF THE INVENTION

Figure 1:
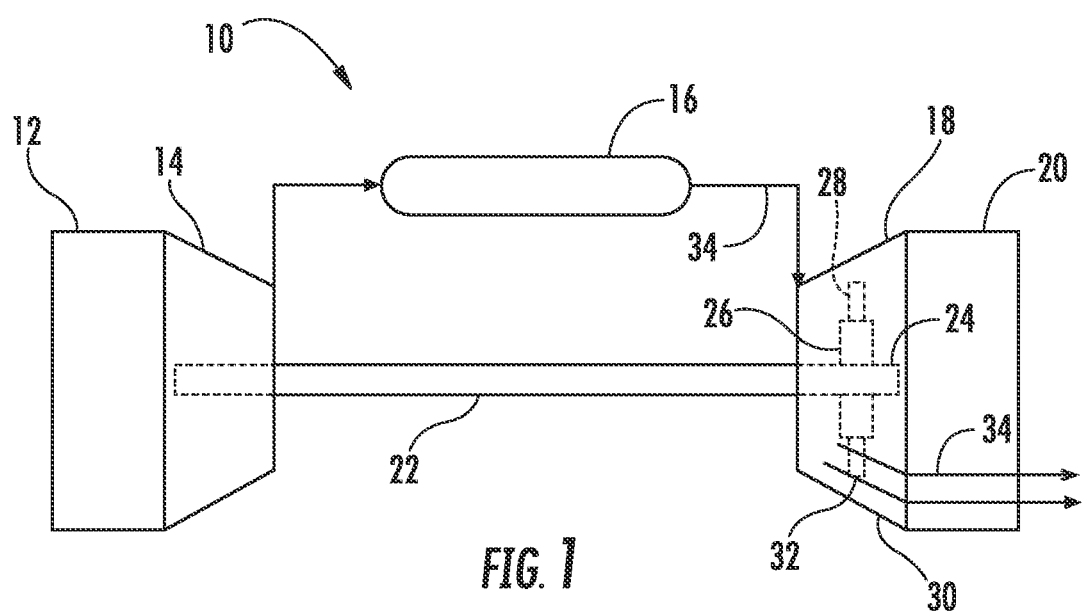
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbomachine including but not limited to a steam turbine, an aircraft gas turbine or marine gas turbine.

Referring now to the drawings, FIG. 1 illustrates a schematic diagram of one embodiment of a gas turbine 10. The gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotor blades 28 extending radially outwardly from and being interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
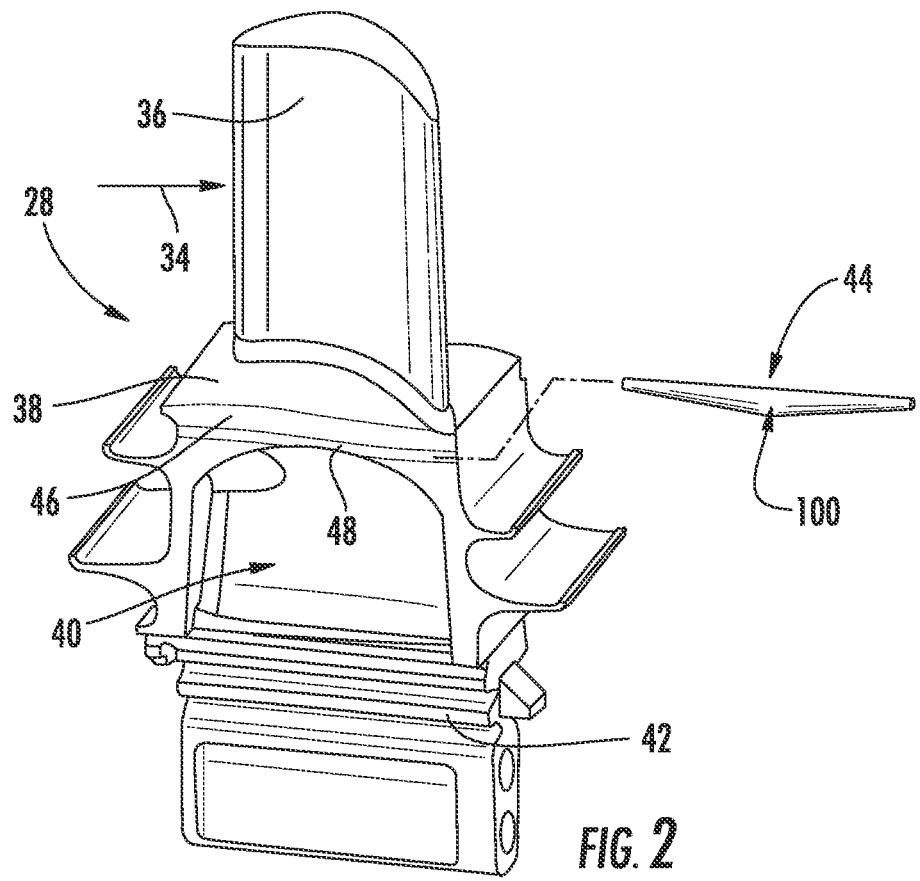
FIG. 2 is a perspective view of an exemplary turbine blade according to at least one embodiment of the present invention.
Figure 3:
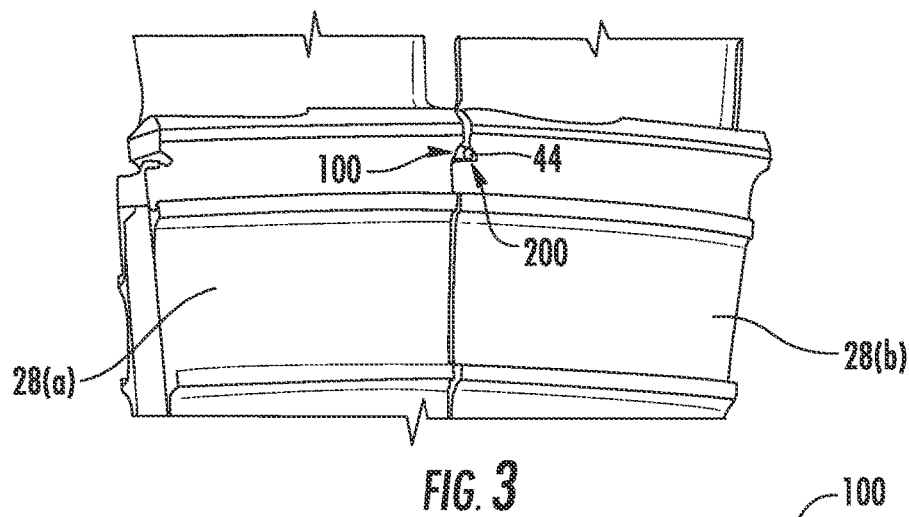
FIG. 3 is a schematic illustration of a damper pin disposed between circumferentially adjacent turbine blades according to at least one embodiment of the present invention.

FIG. 2 illustrates a conventional turbine blade or bucket 28 including an airfoil 36, a platform 38, a shank 40 and a dovetail or mounting portion 42. FIG. 3 provides a downstream view of a pair of circumferentially adjacent turbine blades 28(a), 28(b). As shown in FIG. 2, the dovetail 42 is utilized to secure the turbine blade 28 to a periphery of the rotor disk 26 (FIG. 1), as is well understood in the art. The platform 38 defines an inward flow boundary for the combustion gases 34 flowing through the hot gas path 32 of the turbine section 18 (FIG. 1). In various embodiments of the present invention, a damper pin 44 is located along one axial edge (or slash face) 46 adjacent to (i.e., radially inward of) the turbine blade platform 38. It will be appreciated that a similar damper pin 44 is located between each adjacent pair of turbine blades 28(a), 28(b) (FIG. 3) on the rotor disk 26 (FIG. 1) as apparent from FIG. 3. In particular embodiments, as shown in FIG. 2, the damper pin 44 is located in an elongated groove 48 (FIG. 1) that extends along the entire slash face 46 of the turbine blade 28.

The damper pin 44 serves as a vibration damper. When installed, as shown in FIG. 3, the damper pin 44 is positioned between the adjacent turbine blades 28(a), 28(b). In operation, the damper pin 44 frictionally dissipates vibratory energy and reduces corresponding amplitude of vibration. The amount of vibrational energy that is removed by the damper pin 44 is a function several factors including but not limited to the dynamic weight of the damper pin 44, the geometry of the damper pin 44 and the reaction loads between the adjacent turbine blades 28(a), 28(b).

Figure 4:
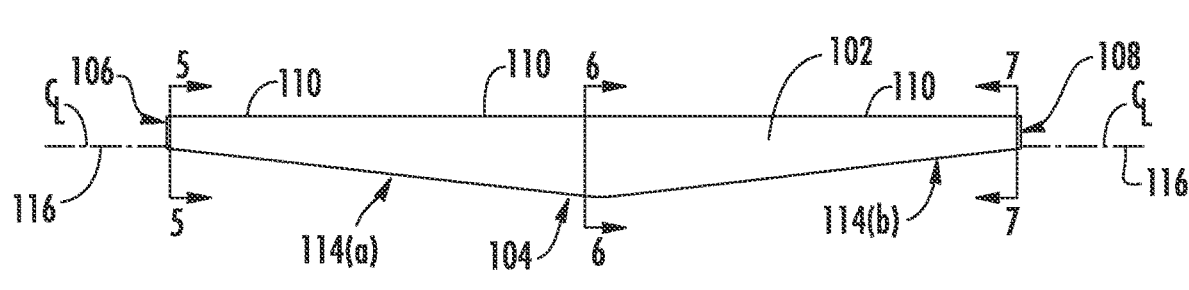
FIG. 4 is a side view of an exemplary damper pin according to one embodiment of the present invention.
Figure 5:
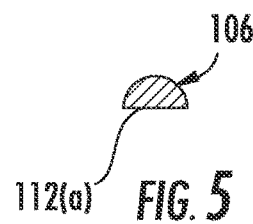
FIG. 5 is a cross sectioned end view of the damper pin as shown in FIG. 4 taken along section line 5-5.
Figure 6:
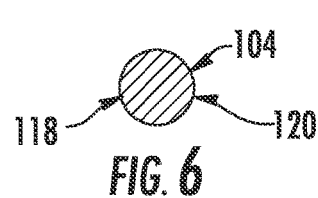
FIG. 6 is a cross sectioned end view of the damper pin as shown in FIG. 4 taken along section line 6-6.
Figure 7:
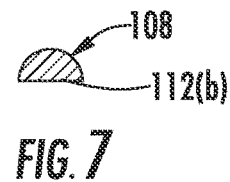
FIG. 7 is a cross sectioned end view of the damper pin as shown in FIG. 4 taken along section line 7-7.
Figure 8:
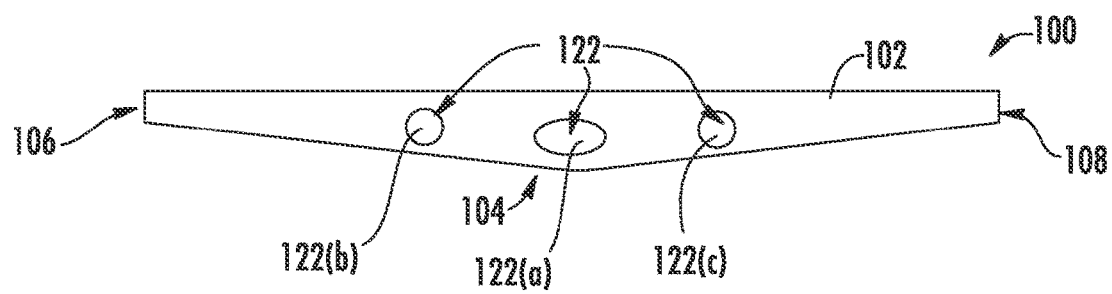
FIG. 8 is a side view of the exemplary damper pin as shown in FIG. 4, according to one embodiment of the present invention.

FIG. 4 is a side view of an exemplary damper pin 100 according to one embodiment of the present invention. FIG. 5 is a cross sectioned end view of the damper pin 100 as shown in FIG. 4 taken along section line 5-5. FIG. 6 is a cross sectioned end view of the damper pin 100 as shown in FIG. 4 taken along section line 6-6. FIG. 7 is a cross sectioned end view of the damper pin 100 as shown in FIG. 4 taken along section line 7-7. FIG. 8 is a side view of the damper pin 100 as shown in FIG. 4, according to one embodiment of the present invention. It is to be understood that damper pin 100 shown in FIGS. 4-8 may be substituted for damper pin 44 as shown in FIGS. 2 and 3.

In one embodiment, as shown in FIG. 4, the damper pin 100 includes an elongated body 102 having a center portion 104 disposed between a first end portion 106 and a second end portion 108. As shown in FIG. 4, the first end portion 106, center portion 104 and the second end portion 108 define a generally arcuate top portion or surface 110 of the elongated body 102. The top portion 110 of the elongated body 102 may be configured (sized and/or shaped) to contact with an inner surface of the groove 48 defined between the adjacent turbine blades 28(a), 28(b).

As shown in FIG. 5, the first end portion 106 has a substantially semi-cylindrical cross sectional shape. As shown in FIG. 6, the center portion 104 has a cylindrical cross sectional shape. As shown in FIG. 7, the second end portion 108 has a substantially semi-cylindrical cross sectional shape. The semi-cylindrical shape of the first end portion 106 and the second end portion 108 creates support surfaces 112(a) (FIG. 5), 112(b) (FIG. 7) that are adapted to rest on machined turbine blade platform surfaces or shoulders at opposite ends of the groove 48 formed in the turbine blade slash face 46, thereby providing support for the damper pin 100 while preventing undesirable excessive rotation during machine operation.

As shown in FIG. 4, a first bottom portion or surface 114(a) of the elongated body 102 diverges radially outwardly with respect to an axial centerline 116 of the elongated body 102 from the first end portion 106 to the center portion 104. A second bottom portion or surface 114(b) of the elongated body 102 diverges radially outwardly with respect to the centerline 116 of the elongated body 102 from the second end portion 108 to the center portion 104. As shown in FIG. 6, the elongated body 102 further includes a first side portion 118 that is laterally opposed to a second side portion 120.

In particular embodiments, as shown in FIG. 8, the elongated body 102 defines at least one laterally extending aperture 122. In at least one embodiment, the elongated body 102 defines a plurality of laterally extending apertures 122(a), 122(b), 122(c). Although three apertures are shown having generally arcuate or round shapes, it should be known that the elongated body 102 may define any number of apertures having any shape and positioned at any location along the elongated body 102.

The aperture(s) 122 extends through the laterally opposing side portions 118, 120 of the elongated body 102. In one embodiment, at least one of the apertures 122(a) is defined proximate to the center portion 104 of the elongated body 102. In addition or in the alternative, at least one aperture 122(b) is defined proximate to the first end portion 106 of the elongated body 102. In addition or in the alternative, at least one aperture 122(c) is defined proximate to the second end portion 108 of the elongated body 102. The aperture(s) 122 may reduce mass of the damper pin 200 while still providing a desired overall stiffness or dampening effect on the adjacent turbine blades 28(a), 28(b).

FIG. 9 is a side view of an exemplary damper pin 200 according to one embodiment of the present invention. FIG. 10 is a cross sectioned end view of the damper pin 200 as shown in FIG. 9 taken along section line 10-10. FIG. 11 is a cross sectioned end view of the damper pin 200 as shown in FIG. 9 taken along section line 11-11. FIG. 12 is a cross sectioned end view of the damper pin 200 as shown in FIG. 9 taken along section line 12-12. FIG. 13 is a side view of the damper pin 200 as shown in FIG. 9, according to one embodiment of the present invention. It is to be understood that damper pin 200 shown in FIGS. 9-13 may be substituted for damper pin 44 as shown in FIGS. 2 and 3.

In one embodiment, as shown in FIG. 9, the damper pin 200 includes an elongated body 202 having a center portion 204 disposed between a first end portion 206 and a second end portion 208. As shown in FIG. 9, the first end portion 206, center portion 204 and the second end portion 208 define a generally arcuate top portion or surface 210 of the elongated body 202. The top portion 210 of the elongated body 202 may be configured (sized and/or shaped) to contact with an inner surface of the groove 48 defined between the adjacent turbine blades 28(a), 28(b).

As shown in FIG. 10, the first end portion 206 has a cylindrical cross sectional shape. As shown in FIG. 6, the center portion 204 has a substantially semi-cylindrical cross sectional shape. As shown in FIG. 7, the second end portion 208 has a cylindrical cross sectional shape.

As shown in FIG. 9, a first bottom portion 214(a) of the elongated body 202 diverges radially inwardly with respect to an axial centerline 216 of the elongated body 202 from the first end portion 206 to the center portion 204. A second bottom portion 214(b) of the elongated body 202 diverges radially inwardly with respect to the centerline 216 of the elongated body 202 from the second end portion 208 to the center portion 204. As shown in FIGS. 10-12, the elongated body 202 further includes a first side portion 218 that is laterally opposed to a second side portion 220.

In particular embodiments, as shown in FIG. 13, the elongated body 202 defines at least one laterally extending aperture 222. In at least one embodiment, the elongated body 202 defines a plurality of laterally extending apertures 222(a), 222(b). Although two apertures 122 are shown having generally arcuate or round shapes, it should be known that the elongated body 202 may define any number of apertures having any shape and positioned at any location along the elongated body 202.

The aperture(s) 222 extend through the laterally opposing side portions 218, 220 of the elongated body 202. In one embodiment, at least one of the apertures 222(a) is defined proximate to the first end portion 206 of the elongated body 202. In addition or in the alternative, at least one aperture 222(b) is defined proximate to the second end portion 208 of the elongated body 202. The aperture(s) 222 may reduce mass of the damper pin 200 while still providing a desired overall stiffness or dampening effect on the adjacent turbine blades 28(a), 28(b).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A damper pin for damping adjacent turbine blades coupled to a rotor shaft, the damper pin comprising;
an elongated body having a center portion disposed between a first end portion and a second end portion, the first end portion, the center portion and the second end portion defining a generally arcuate top portion of the elongated body, at least a portion of the top portion configured to contact with an inner surface of a groove defined between the adjacent turbine blades;
a first planar bottom surface of the elongated body extending from the first end portion to the center portion at a first angle; and
a second planar bottom surface of the elongated body extending from the second end portion to the center portion at a second angle different from the first angle;
wherein the first end portion and the second end portion have substantially semi-cylindrical cross sectional shapes and the center portion has a cylindrical cross sectional shape and wherein the first planar bottom surface and the second planar bottom surface meet at the center portion of the elongated body.

2. The damper pin as in claim 1, wherein the first end portion and the second end portion of the elongated body are spaced apart along an axial direction, the damper pin further comprising at least one enclosed aperture extending through the elongated body along a lateral direction perpendicular to the axial direction.

3. The damper pin as in claim 2, wherein the aperture extends through laterally opposing side walls of the elongated body.

4. The damper pin as in claim 2, wherein the aperture is defined proximate to the center portion of the elongated body.

5. The damper pin as in claim 2, wherein the aperture is defined proximate to the first end portion of the elongated body.

6. The damper pin as in claim 2, wherein the aperture is defined proximate to the second end portion.

7. A damper pin for damping adjacent turbine blades coupled to a rotor shaft, the damper pin defining an axial direction and a radial direction perpendicular to the axial direction, the damper pin comprising:
an elongated body having a center portion disposed between a first end portion and a second end portion, the first end portion, center portion and second end portion defining a generally arcuate top portion of the elongated body, at least a portion of the top portion configured to contact with an inner surface of a groove defined between the adjacent turbine blades;
wherein the first end portion and the second end portion have cylindrical cross sectional shapes and the center portion has a substantially semi-cylindrical cross sectional shape;
wherein a bottom portion of the elongated body converges radially inwardly with respect to an axial centerline of the elongated body from the first end portion and the second end portion to the center portion.

8. The damper pin as in claim 7, further comprising at least one enclosed aperture extending through the elongated body along a lateral direction perpendicular to the axial direction.

9. The damper pin as in claim 8, wherein the aperture extends through laterally opposing side walls of the elongated body.

10. The damper pin as in claim 8, wherein the aperture is defined proximate to the center portion of the elongated body.

11. The damper pin as in claim 8, wherein the aperture is defined proximate to the first end portion of the elongated body.

12. The damper pin as in claim 8, wherein the aperture is defined proximate to the second end portion.

13. A turbine engine, comprising:
a rotor shaft that extends axially within the turbine engine;
an adjacent pair of turbine blades coupled to the rotor shaft, each turbine blade at least partially defining a groove that extends along a slash face of the corresponding turbine blade; and
a damper pin disposed within the groove, the damper pin comprising:
an elongated body having a center portion disposed between a first end portion and a second end portion, the first end portion, the center portion and the second end portion defining a generally arcuate top portion of the elongated body, at least a portion of the top portion configured to contact with an inner surface of the groove defined between the adjacent turbine blades;
a first planar bottom surface of the elongated body extending from the first end portion to the center portion at a first angle; and
a second planar bottom surface of the elongated body extending from the second end portion to the center portion at a second angle different from the first angle;
wherein the first end portion and the second end portion have substantially semi-cylindrical cross sectional shapes and the center portion has a cylindrical cross sectional shape and wherein the first planar bottom surface and the second planar bottom surface meet at the center portion of the elongated body.

14. The turbine engine as in claim 13, wherein the elongated body defines at least one enclosed aperture extending perpendicularly to the rotor shaft.

15. The turbine engine as in claim 14, wherein the aperture extends through laterally opposing side walls of the elongated body.

16. The turbine engine as in claim 14, wherein the aperture is defined proximate to the center portion of the elongated body.

17. The turbine engine as in claim 14, wherein the aperture is defined proximate to one of the first end portion or the second end portion of the elongated body.

* * * * *